United States Patent
Yu et al.

(10) Patent No.: US 9,574,739 B2
(45) Date of Patent: Feb. 21, 2017

(54) LENS FOR LIGHT EMITTING DIODE AND LED MODULE HAVING THE LENS

(71) Applicant: HON HAI PRECISION INDUSTRY CO., LTD., New Taipei (TW)

(72) Inventors: Tai-Cherng Yu, New Taipei (TW); Chien-Hui Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 122 days.

(21) Appl. No.: 14/448,836

(22) Filed: Jul. 31, 2014

(65) Prior Publication Data

US 2015/0300595 A1    Oct. 22, 2015

(30) Foreign Application Priority Data

Apr. 16, 2014  (TW) .............................. 103113941 A

(51) Int. Cl.

| | |
|---|---|
| *F21V 5/04* | (2006.01) |
| *F21V 13/02* | (2006.01) |
| *F21K 99/00* | (2016.01) |
| *F21V 7/00* | (2006.01) |
| *G02B 19/00* | (2006.01) |
| *G02B 5/02* | (2006.01) |
| *F21Y 101/00* | (2016.01) |

(52) U.S. Cl.
CPC .................. *F21V 5/046* (2013.01); *F21V 5/04* (2013.01); *F21V 7/0091* (2013.01); *G02B 19/0028* (2013.01); *G02B 19/0061* (2013.01); *F21Y 2101/00* (2013.01); *G02B 5/0215* (2013.01)

(58) Field of Classification Search
CPC .......... F21V 5/046; F21V 7/0091; F21V 5/04; G02B 19/0028; G02B 19/0061
See application file for complete search history.

(56) References Cited

U.S. PATENT DOCUMENTS

| 5,485,317 A | * | 1/1996 | Perissinotto | ......... G02B 6/0001 257/E33.059 |
| 8,068,288 B1 | * | 11/2011 | Pitou | ........................ G02B 3/08 359/743 |
| 8,517,572 B2 | * | 8/2013 | Ferenc | ............. B29D 11/00009 313/116 |

(Continued)

FOREIGN PATENT DOCUMENTS

| CN | 202796936 U | 3/2013 |
| TW | M432143 U | 6/2012 |
| TW | 201344248 A | 11/2013 |

*Primary Examiner* — Joseph L Williams
(74) *Attorney, Agent, or Firm* — Zhigang Ma

(57) ABSTRACT

A lens for an LED includes a top face, a bottom face, and a circumferential periphery interconnecting the top and bottom faces. The top face defines a recess therein. A concave wall defines a bottom of the recess. In cross section of the lens, the concave wall consists of two symmetrical curves extending outward and upwardly from a bottom tip of the recess to connect with the top face. Each curve is a part of a hyperbola. The cavity is for receiving an LED therein. The lens further forms a cone-shaped top wall enclosing a top of the cavity. Light emitted from the LED travels through the cone-shaped top wall to strike the concave wall and be reflected thereby to radiate sideward and downwardly. The sideward and downwardly reflected light then is reflected by a reflective coating on a substrate to illuminate upwardly.

17 Claims, 9 Drawing Sheets

(56) References Cited

U.S. PATENT DOCUMENTS

| | | | |
|---|---|---|---|
| 2013/0027926 A1* | 1/2013 | Chiu | F21V 3/00 362/235 |
| 2014/0071675 A1* | 3/2014 | Chang | F21K 9/135 362/240 |

* cited by examiner

LENS FOR LIGHT EMITTING DIODE AND LED MODULE HAVING THE LENS

FIELD

The present disclosure relates to a lens, and, more particularly to a lens for a light emitting diode (LED) wherein the lens can cause more light from the LED to move laterally downwardly, and an LED module having the lens.

BACKGROUND

LEDs have increased in popularity due to many advantages, such as: high luminosity, low operational voltage, quick response time, and low power consumption. However, since LEDs are point light sources, how to uniformly distribute the light from LEDs become an issue. This issue is more significant when the LEDs are used as light sources for an application which requires a uniform illumination such as a backlight module for a liquid crystal display (LCD) panel.

Usually, a secondary optical element is used to improve the uniformity of the light from the LEDs. However, it is found that the conventional secondary optical element cannot satisfy the requirement.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the present LED lens and LED module having the lens. Moreover, in the drawings, like reference numerals designate corresponding parts throughout the several views.

DETAILED DESCRIPTION OF EMBODIMENTS

Figure 1:
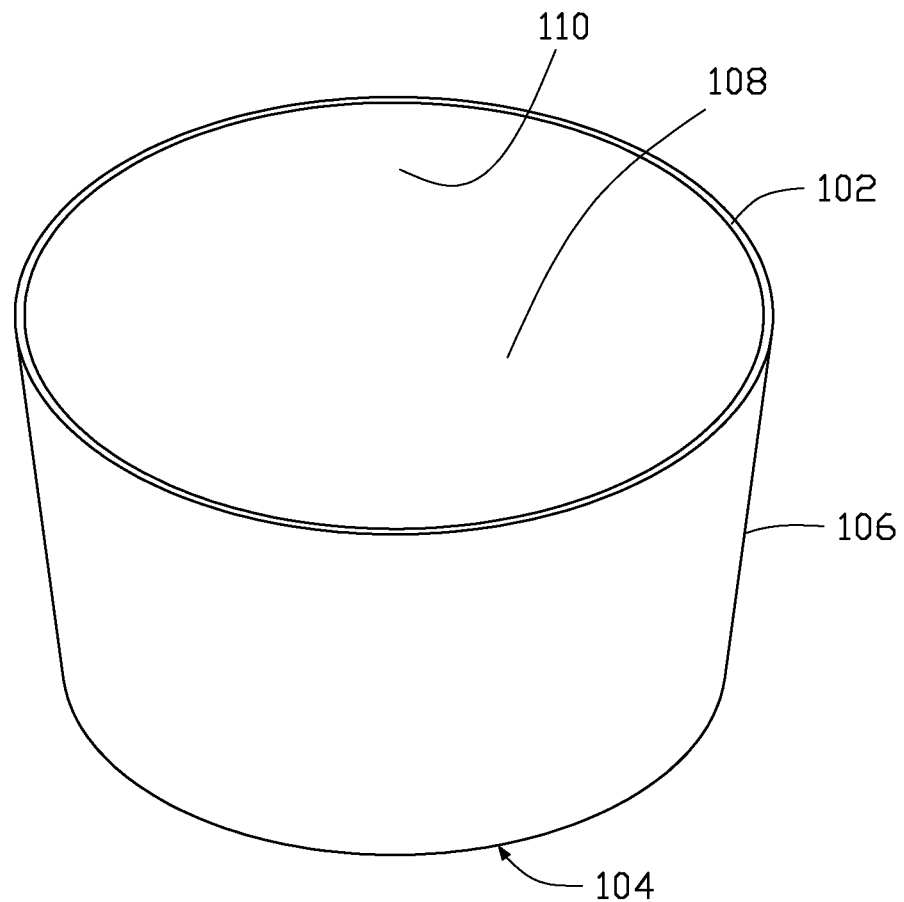
FIG. 1 is a perspective view of a lens in accordance with a first embodiment of the present disclosure.
Figure 2:
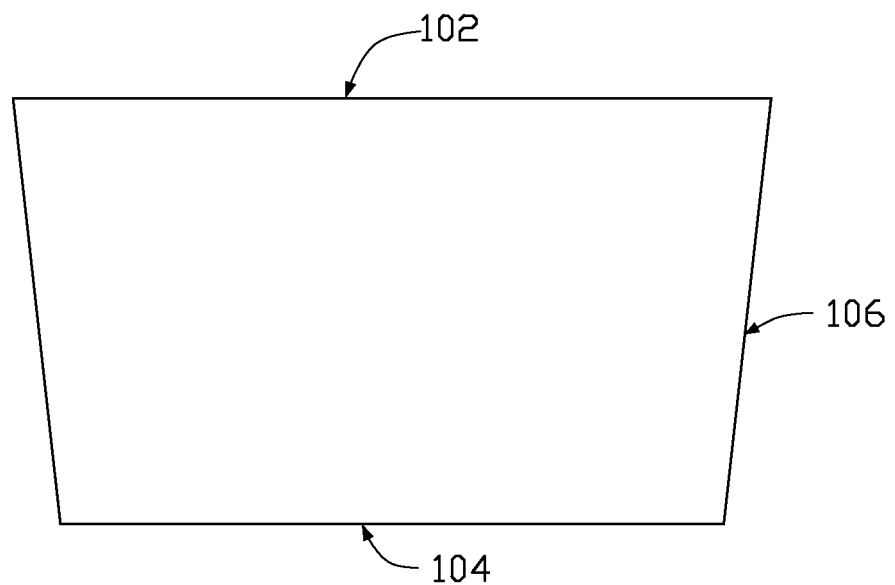
FIG. 2 is a front view of the lens of FIG. 1.
Figure 3:
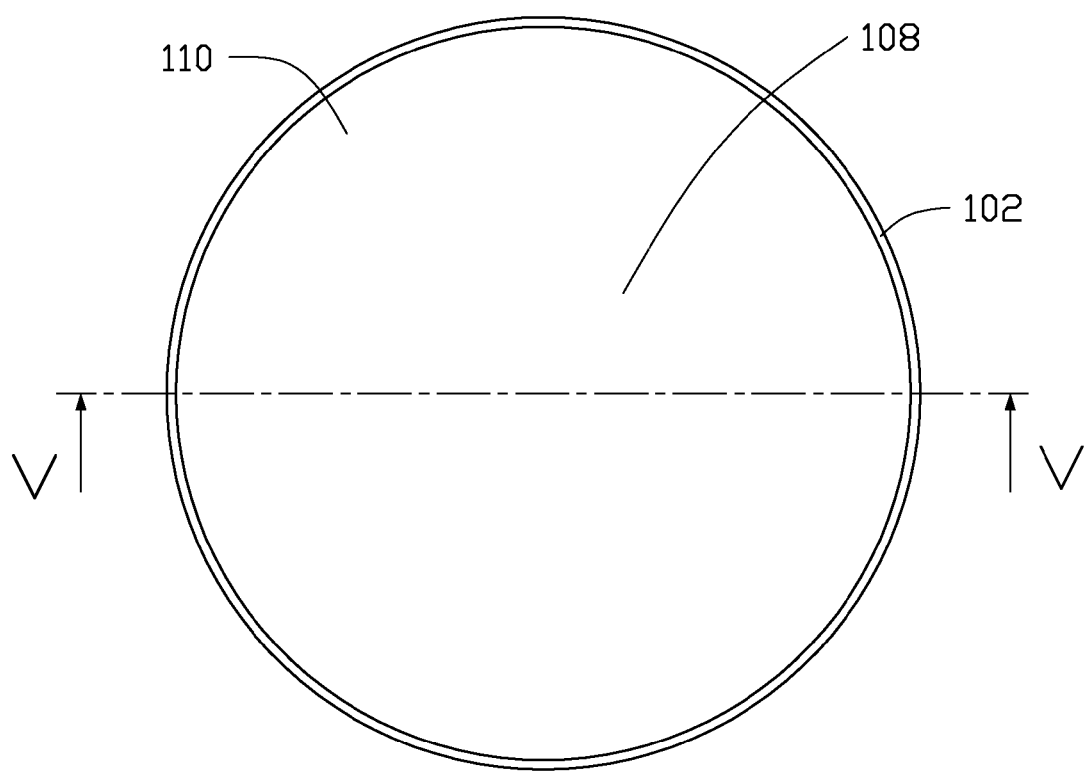
FIG. 3 is a top view of the lens of FIG. 1.
Figure 4:
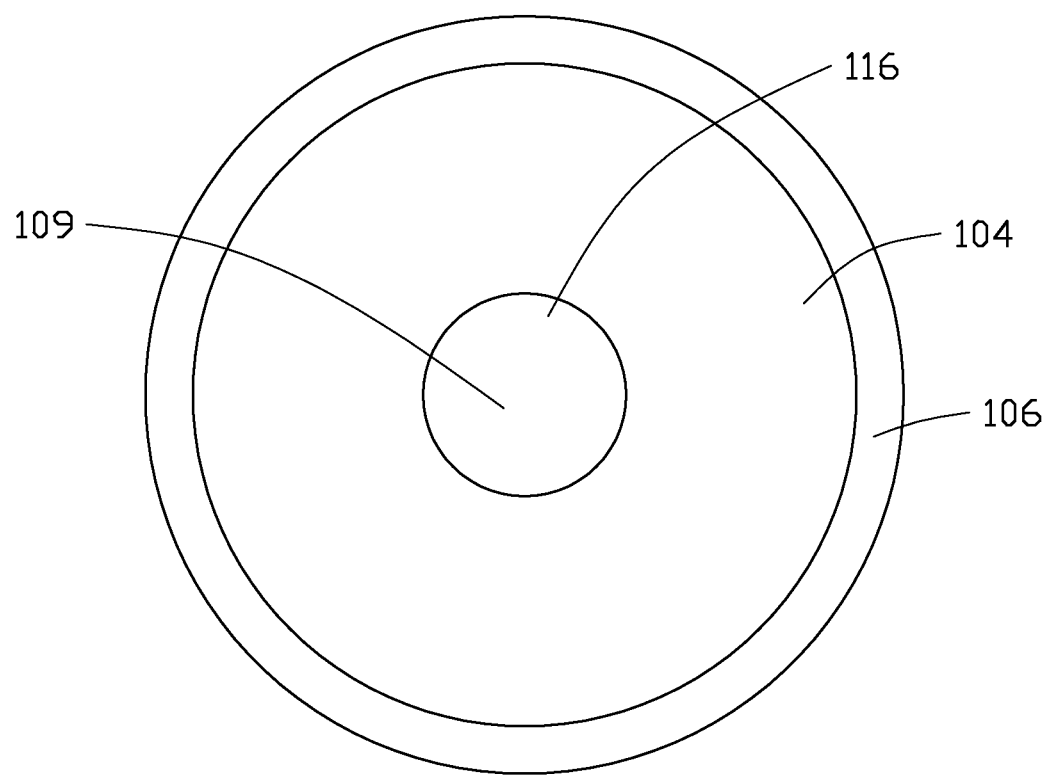
FIG. 4 is a bottom view of the lens of FIG. 1.

Referring to FIGS. 1 to 5, a lens 10 for an LED in accordance with a first embodiment of the present disclosure includes a top face 102, a bottom face 104 and a circumferential periphery 106 interconnecting the top and bottom faces 102, 104. The lens 10 is made of transparent material such as glass, polycarbonate (PC) or polymethyl methacrylate (PMMA), and has an overall configuration resembling a truncated cone. The circumferential periphery 106 extends inwardly and downwardly from the top face 102 to the bottom face 104.

Figure 5:
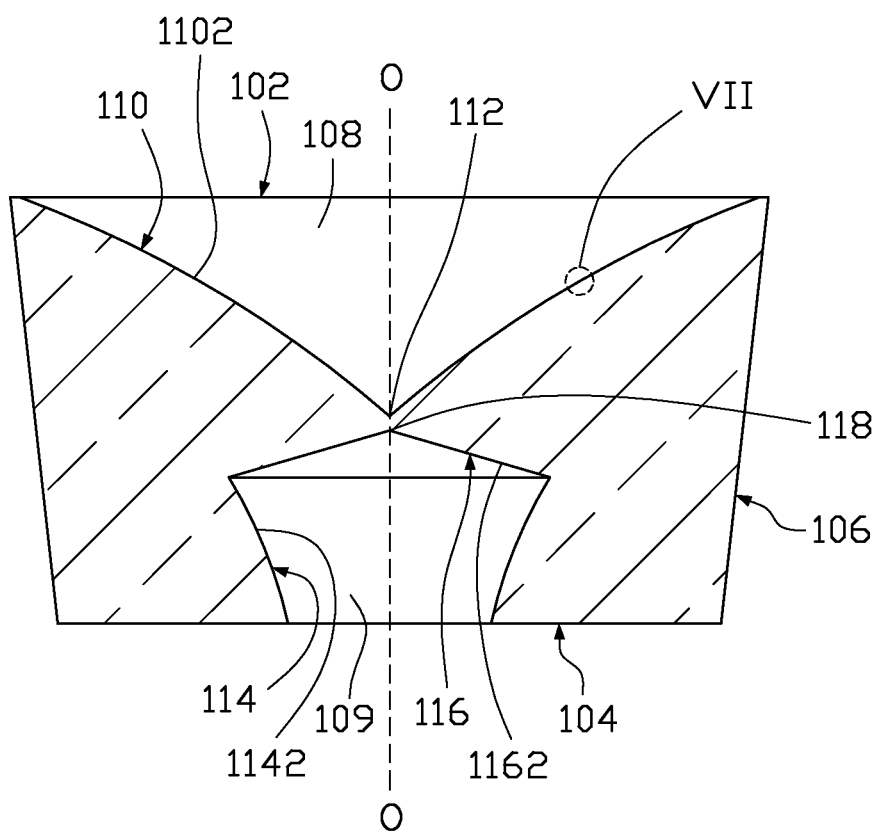
FIG. 5 is a cross-sectional view of FIG. 3, taken along line V-V thereof.

As illustrated in FIG. 5, the top face 102 of the lens 10 defines a downward recess 108 having a bottom tip 112 at a central line O-O of the lens 10. As shown in the cross section, two symmetrical curves 1102 of a concave wall 110 define a bottom of the recess 108 which evolves upwardly and outwardly from the bottom tip 112 to connect with the top surface 102. Each curve 1102 can be a part of a hyperbola, and protrudes upwardly and inwardly.

The bottom face 104 of the lens 10 defines a cavity 109 recessed upwardly. The cavity 109 is defined by a cone-shaped top wall 116, and a curved side wall 114 formed in the lens 10 and below the recess 108. The cone-shaped top wall 116 encloses a top part of the cavity 109 and has a top tip 118 at the central line O-O of the lens 10 and below the bottom tip 112 of the recess 108. In the cross section of FIG. 5, the cone-shaped top wall 116 includes two symmetrical, straight lines 1162 extending downwardly and outwardly from the top tip 118. The curved side wall 114 encloses a lower part of the cavity 109 and includes two curves 1142 each having a top end connecting with a bottom of a corresponding straight line 1162 of the top wall 116 and a bottom end connecting with the bottom face 104. Each curve 1142 is a part of a circle and protrudes inwards and upwardly.

Figure 6:
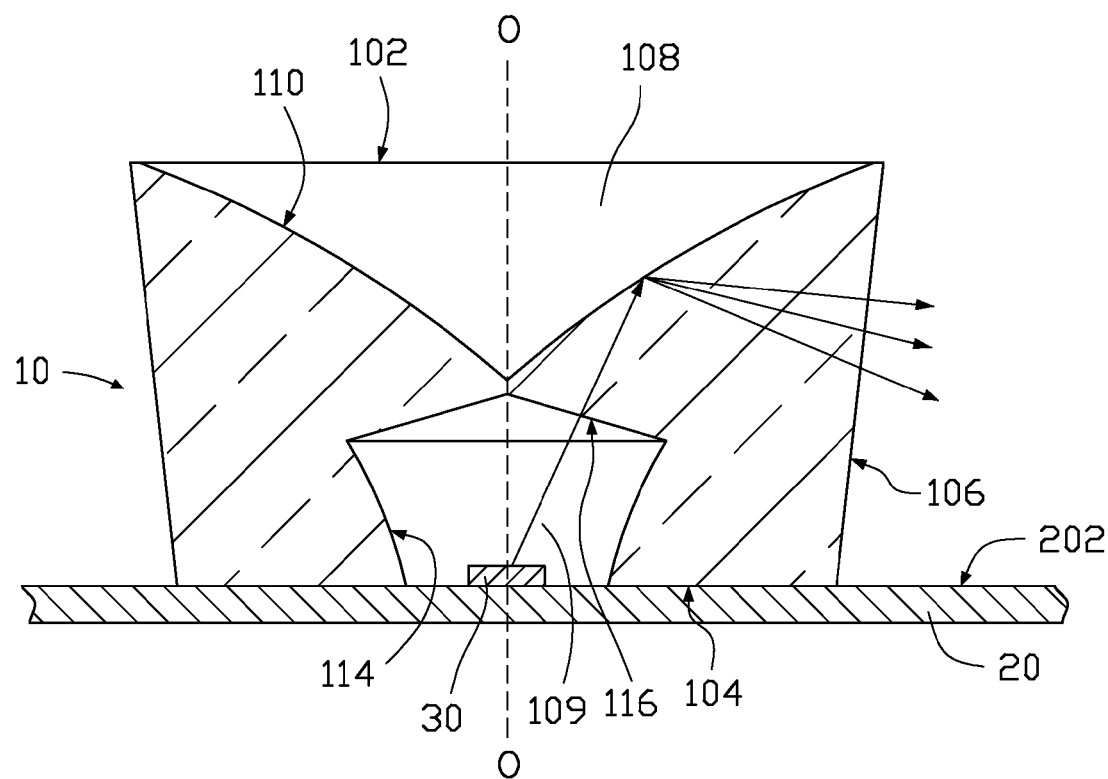
FIG. 6 is a cross-sectional view showing an LED module in accordance with an embodiment of the present disclosure.

Referring to FIG. 6, a light emitting diode (LED) module 40 having the LED lens 10 is shown. The LED module 40 has a substrate 20, an LED 30 mounted on the substrate 20 and the lens 10 mounted on the substrate 20 and covering the LED 30. The number of the LEDs 30 and the lens 10 of the LED module 40 in actual use can be more than one. For a direct-type LED backlight module for illuminating a LCD panel, the LED module 40 can include more than thirty LEDs 30 and corresponding lens 10 arranged in an array on the substrate 20, wherein the substrate 40 is generally square. For a light bar, the LED module 40 can include more than five LEDs 30 and corresponding lens 10 arranged in a line on the substrate 40, wherein the substrate 40 is elongated.

When the LED 30 emits light, most of the light as shown by arrows in FIG. 6 strikes the concave wall 110 through the top wall 116 defining the cavity 109 and is reflected by the concave wall 110 to radiate laterally and downwardly. The substrate 20 on which the LED 30 and the lens 10 are mounted has a top surface which is applied with a reflective coating 202 thereon. The light reflected by the concave wall 110 to radiate laterally and downwardly is reflected by the reflective coating 202 to move upwardly to illuminate an object located above the LED module 40, which in the present disclosure is a diffuser (not shown) of the LED module 40, wherein the LED module 40 is used as an LED backlight module.

Figure 7:
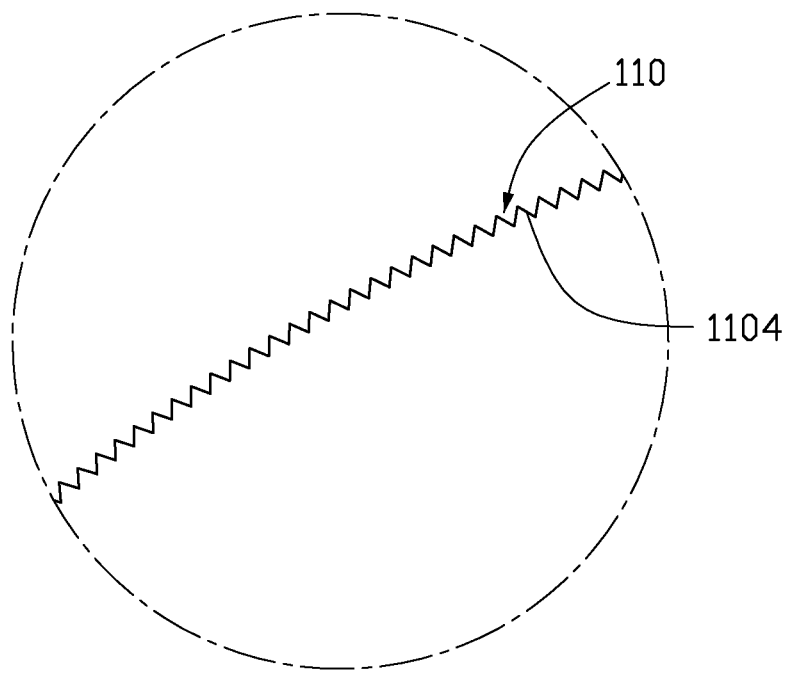
FIG. 7 is an enlarged view of a circled part VII of FIG. 5, showing the lens in accordance with an alternative embodiment of the present disclosure.

The concave wall 110 of the lens 10 in accordance with the first embodiment of the present disclosure is smooth. Alternatively, the concave wall 110 can have diffraction optics elements thereon, as shown in FIG. 7. The diffraction optics elements in FIG. 7 are a plurality of continuous serrations 1104. The diffraction optics elements 1104 can help the concave wall 110 to reflect the light in more diverse directions whereby the light output from the LED module 40 can be more uniformly distributed over a large angle of illumination.

Figure 8:
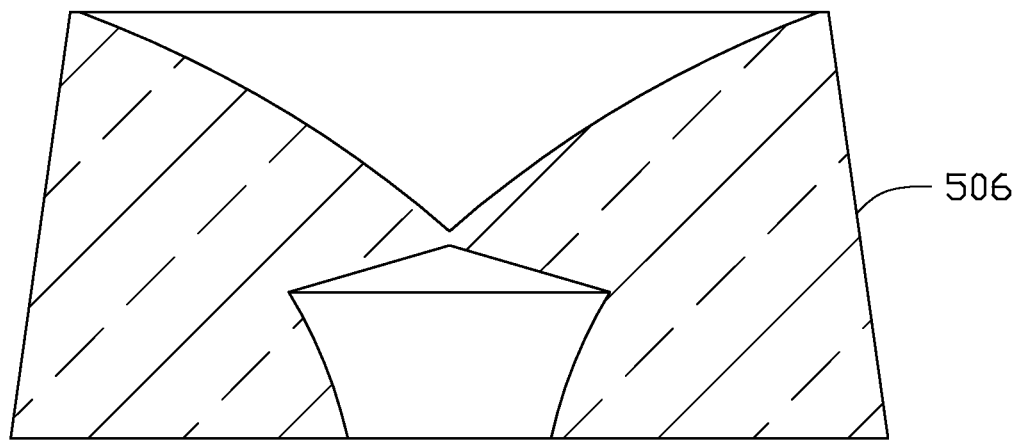
FIG. 8 is a cross-sectional view showing the lens in accordance with a further alternative embodiment of the present disclosure.

The circumferential periphery 106 of the lens 10 in accordance with the one embodiment has a diameter gradually decreasing along top to bottom direction of the lens 10. Alternatively, as shown in FIG. 8, a lens 50 in accordance with another embodiment has a circumferential periphery 506 having a diameter gradually increasing along top to bottom direction of the lens 50. The other structures of the lens 50 are substantially the same as that of the lens 10.

Figure 9:
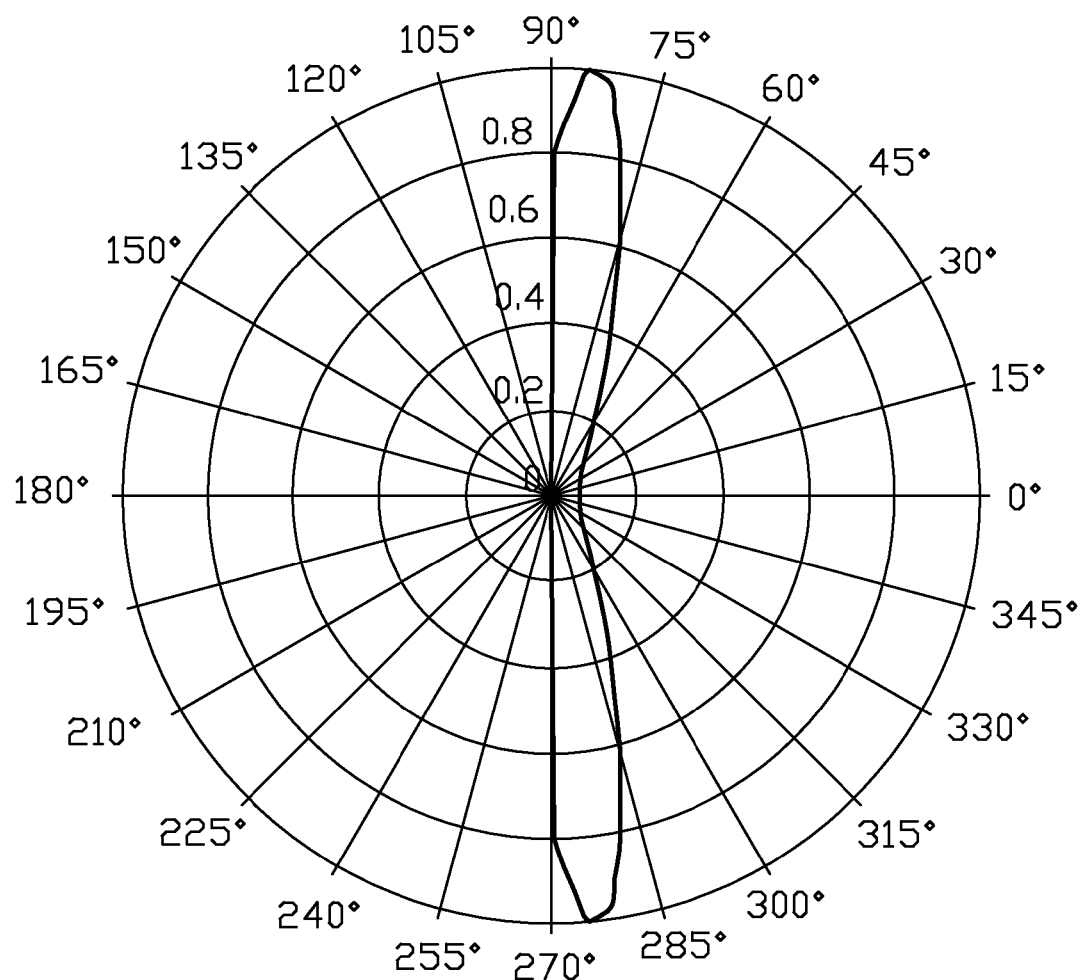
FIG. 9 is a luminous intensity distribution curve obtained by the LED module in accordance with the present disclosure.

In accordance with the present disclosure, since most light emitted from the LED 30 is reflected by the concave wall 110 to radiate laterally and downwardly and then be reflected by the reflective coating 202 on the top surface of the substrate 20 to emit upwardly out of the LED module 40, the light emitted from the LED module 40 can have a uniform luminous intensity over a large angle of illumination as shown in FIG. 9, wherein the angle of illumination can reach 180 degrees.

It is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. A lens for a light emitting diode (LED) comprising:
   a top face defining a recess extending downwardly;
   a bottom face defining a cavity recessing upwardly, the cavity being configured for receiving an LED;
   a circumferential periphery interconnecting the top face and the bottom face;
   wherein the lens comprises a concave wall defining a bottom of the recess and a cone-shaped top wall below the recess and defining a top of the cavity; and
   wherein in a cross-section of the lens, the concave wall comprises two symmetrical curves evolving upwardly and outwardly from a bottom tip of the recess toward the top face of the lens, and the cone-shaped stop wall comprises two symmetrical straight lines extending outwardly and downwardly from a top tip of the cavity toward the bottom face.

2. The lens of claim 1, wherein the lens has an overall configuration of a truncated cone.

3. The lens of claim 2, wherein the circumferential periphery of the lens has a diameter gradually decreasing along a top-to-bottom direction of the lens.

4. The lens of claim 2, wherein the circumferential periphery of the lens has a diameter gradually increasing along a top-to-bottom direction of the lens.

5. The lens of claim 1, wherein each of the curves is a part of a hyperbola and protruding upwardly and inwardly.

6. The lens of claim 1, wherein the concave wall is smooth.

7. The lens of claim 1, wherein the concave wall has a plurality of diffraction optics elements formed thereon.

8. The lens of claim 7, wherein the plurality of diffraction optics elements comprises a plurality of continuous serrations.

9. The lens of claim 1, wherein the lens forms a curved side wall therein, the curved side wall enclosing a lower part of the cavity, and wherein in the cross section of the lens, the curved side wall comprises two symmetrical curves each extending downwardly from a bottom end of a corresponding straight line to connect with the bottom face of the lens, each of the two symmetrical curves of the curved side wall is a part of a circle.

10. An LED module comprising:
    a substrate having a top face which is optically reflective;
    an LED mounted on the top face of the substrate; and
    a lens mounted on the top face of the substrate, comprising:
      a top face defining a recess extending downwardly;
      a bottom face defining a cavity recessing upwardly, the cavity receiving the LED therein; and
      a circumferential periphery interconnecting the top face and the bottom face;
      wherein the lens further has a concave wall defining a bottom of the recess and a cone-shaped top wall below the recess and defining a top of the cavity, and wherein in a cross section of the lens, the concave wall comprises two symmetrical curves evolving upwardly and outwardly from a bottom tip of the recess toward the top face and the cone-shaped top wall comprises two symmetrical straight lines extending outwardly and downwardly from a top tip of the cavity toward the bottom face; and
      wherein light emitting from the LED has at least a part radiating through the cone-shaped top wall to strike on and be reflected by the concave wall to travel laterally and downwardly toward the top face of the substrate.

11. The LED module of claim 10, wherein each of the curves is a part of a hyperbola and protrudes upwardly and inwardly.

12. The LED module of claim 11, wherein each of the curves is a smooth curve.

13. The LED module of claim 11, wherein each of the curves comprises a plurality of continuous serrations.

14. The LED module of claim 11, wherein the circumferential periphery has a diameter gradually decreasing along a top-to-bottom direction of the lens.

15. The LED module of claim 11, wherein the circumferential periphery has a diameter gradually increasing along a top-to-bottom direction of the lens.

16. The LED module of claim 11, wherein the lens further forms therein a curved side wall defining a lower part of the cavity, the curved side wall interconnects the cone-shaped top wall and the bottom face of the lens, and the curve side wall has profile which is a part of a circle.

17. A lens for a light emitting diode, comprising:
    a lens element having a top side, a bottom side, generally parallel to the top side, and a side wall;
    wherein, the lens element top includes a generally conical recess and the lens element surface of the generally conical recess is generally convex in shape; and
    wherein, the lens element bottom includes a cavity, the innermost surface of the lens bottom cavity being conical in shape;
    wherein the lens bottom cavity includes an innermost portion and an outer portion connected to the innermost portion and open to the exterior of the lens element;
    wherein, the outer portion of the lens bottom cavity is generally shaped like a truncated right circular cone extending outward from the conical innermost portion of the bottom cavity and the lens element surface of the generally truncated right circular conical outer portion of the bottom cavity is convex.

* * * * *